(12) United States Patent
Li et al.

(10) Patent No.: US 12,359,272 B2
(45) Date of Patent: Jul. 15, 2025

US012359272B2

(54) HIGH-STRENGTH HIGH-TOUGHNESS AND WEAR-RESISTANT COMPOSITE STEEL PLATE AND MANUFACTURING METHOD THEREFOR

(71) Applicant: BAOSHAN IRON & STEEL CO., LTD., Shanghai (CN)

(72) Inventors: Hongbin Li, Shanghai (CN); Xiangqian Yuan, Shanghai (CN); Sihai Jiao, Shanghai (CN); Liandeng Yao, Shanghai (CN); Xiaojun Liang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 239 days.

(21) Appl. No.: 16/766,939

(22) PCT Filed: Nov. 21, 2018

(86) PCT No.: PCT/CN2018/116580
§ 371 (c)(1),
(2) Date: May 26, 2020

(87) PCT Pub. No.: WO2019/105264
PCT Pub. Date: Jun. 6, 2019

(65) Prior Publication Data
US 2021/0032717 A1    Feb. 4, 2021

(30) Foreign Application Priority Data
Nov. 28, 2017   (CN) .................... 201711217341.4

(51) Int. Cl.
| | | |
|---|---|---|
| *C21D 6/00* | (2006.01) | |
| *B32B 15/01* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |

(52) U.S. Cl.
CPC .............. *C21D 9/46* (2013.01); *B32B 15/011* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C22C 38/54* (2013.01); *C21D 2211/001* (2013.01); *C21D 2211/008* (2013.01)

(58) Field of Classification Search
CPC ....... B32B 15/011; C21D 6/004; C21D 6/005; C21D 6/008; C21D 8/0205; C21D 8/0226; C21D 8/0263; C22C 38/02; C22C 38/04; C22C 38/06; C22C 38/44
See application file for complete search history.

(56) References Cited

U.S. PATENT DOCUMENTS

| | | | |
|---|---|---|---|
| 2002/0048529 A1* | 4/2002 | Kucharczyk | C22C 38/001 420/72 |
| 2010/0003540 A1* | 1/2010 | Koseki | C22C 38/44 428/638 |
| 2014/0124102 A1* | 5/2014 | Zhang | C22C 38/28 148/335 |
| 2015/0191806 A1* | 7/2015 | Li | C21D 6/008 148/330 |
| 2017/0312862 A1* | 11/2017 | Wasson | C22C 38/48 |
| 2019/0153559 A1* | 5/2019 | Song | C21D 8/0205 |

FOREIGN PATENT DOCUMENTS

| | | | |
|---|---|---|---|
| CN | 1136086 A | * | 11/1996 |
| CN | 101270439 | | 9/2008 |
| CN | 104498838 | | 4/2015 |
| CN | 105499269 | | 4/2016 |
| CN | 105886881 | | 8/2016 |
| CN | 107287500 | | 10/2017 |
| JP | 2668055 B2 | * | 10/1997 |
| JP | 2013076148 | | 4/2013 |

(Continued)

OTHER PUBLICATIONS

Office Action mailed on Jun. 1, 2021 for Japanese Patent Application No. 2020529182.
Supplementary European Search Report dated Nov. 20, 2020 in co-pending European Patent Application No. EP 18 88 4100.
International Search Report and Written Opinion mailed on Feb. 19, 2019 for PCT Patent Application No. PCT/CN2018/116580.

*Primary Examiner* — Jonathan Johnson
*Assistant Examiner* — Maxwell Xavier Duffy
(74) *Attorney, Agent, or Firm* — Lei Fang, Esq.; Smith Tempel Blaha LLC

(57) ABSTRACT

Disclosed is a high-strength high-toughness and wear-resistant composite steel plate, comprising a substrate layer and a composite layer of which a single side or double sides are composited on the substrate layer. The substrate layer is a carbon steel layer and the composite layer is a ultra-high manganese steel layer with a content of Mn element in the composite layer being about 16.00-25.00 wt. %. Further disclosed is a manufacturing method for making the high-strength high-toughness and wear-resistant composite steel plate. With high strength and hardness, high wear resistance and high toughness, the high-strength high-toughness and wear-resistant composite steel plate has excellent comprehensive performance.

7 Claims, No Drawings

(56) References Cited

FOREIGN PATENT DOCUMENTS

| KR | 1758567 B1 * | 7/2017 | ........... B32B 15/011 |
|----|--------------|--------|-------------------------|
| WO | 2008013233 A1 | 1/2008 | |
| WO | 2017101770 A1 | 6/2017 | |

* cited by examiner

HIGH-STRENGTH HIGH-TOUGHNESS AND WEAR-RESISTANT COMPOSITE STEEL PLATE AND MANUFACTURING METHOD THEREFOR

CROSS-REFERENCE TO RELATED APPLICATIONS

This application is a 371 U.S. National Phase of PCT International Application No. PCT/CN2018/116580 filed on Nov. 21, 2018, which claims benefit and priority to Chinese patent application no. 201711217341.4 filed on Nov. 28, 2017, the content of which is incorporated by reference herein in its entirety.

TECHNICAL FIELD

The present disclosure relates to a steel plate and a method for manufacturing the same, particularly to a high-strength, high-toughness and wear-resistant composite steel plate and a method for manufacturing the same.

BACKGROUND ART

Ultra-high manganese steel is widely used for wear-resistant parts in a number of industries, especially for soft abrasives, and for use under large-angle erosive wear conditions, such as for impact plates of fan coal mills. Ultra-high manganese steel is developed by increasing carbon and manganese contents on the basis of the standard composition of ordinary high-manganese steel. It not only has a high work hardening rate, but also maintains a high-toughness austenite structure. It has good wear resistance under medium to low impact conditions. It is proved in experiments and real production and use that an impact plate of this material has a service life nearly twice that of an impact plate of ordinary high-manganese steel. At home and abroad, ultra-high manganese steel as a wear-resistant material has been made into products.

However, there are still some problems with ultra-high manganese steel. For example, due to its low strength and hardness, it is inapplicable to key structural members that need load-bearing capability. In addition, ultra-high manganese steel also has some problems in use. For example, due to its high rheological property, when ultra-high manganese steel is used as a lining plate for a large mill, the lining plate expands and arches under impact, such that bolts are snapped and fall off. For another instance, when ultra-high manganese steel is used for a partition board or a grid plate, the rheological behavior of the material blocks the grid gap, and the output of the mill is seriously reduced. Therefore, ultra-high manganese steel, a high-quality wear-resistant material, has some deficiencies in use.

In most cases, ultra-high manganese steel is produced by casting. Generally, the inner part of a cast ingot has poor quality and a good number of flaws. Some deficiencies such as proneness to cracking appear in use. This greatly reduces the service life of the product and increases the cost of use, which is not conducive to product marketing.

In view of the above, it is desirable to obtain a steel plate that combines ultra-high manganese steel with low-alloy high-strength steel, which can not only improve the strength and hardness of the material, but also avoid the defect of severe deformation of the ultra-high manganese steel under stress. As such, the steel plate can greatly improve the comprehensive properties of the materials and increase the service life of the materials.

SUMMARY

One of the objects of the present disclosure is to provide a high-strength, high-toughness and wear-resistant composite steel plate, which has high strength, good toughness, and excellent wear resistance. It has superior comprehensive properties, can greatly increase the service life of products, and has a wide range of applications.

In order to achieve the above object, there is proposed herein a high-strength, high-toughness and wear-resistant composite steel plate comprising a substrate layer and a compounding layer compounded on one or both surfaces of the substrate layer, wherein the substrate layer is a carbon steel layer, and the compounding layer is an ultra-high manganese steel layer, wherein the compounding layer has a Mn element content of 16.00-25.00 wt %.

In the technical solution described in the present disclosure, the high-strength, high-toughness and wear-resistant composite steel plate is obtained by a rolling compounding process in which not only the excellent mechanical properties of the substrate layer, such as high strength and hardness, are utilized to remedy the deficiencies of low strength, low hardness and proneness to deformation of the compounding layer before processing and hardening, but also the advantage is taken of high wear resistance of the compounding layer, thereby imparting excellent comprehensive properties to the finally obtained high-strength, high-toughness and wear-resistant composite steel plate. These excellent comprehensive properties are beneficial to wide engineering applications of the composite steel plate.

In addition, the rolling compounding process for producing the high-strength, high-toughness and wear-resistant composite steel plate is advantageous in reducing the thickness of the compounding layer (i.e., ultra-high manganese steel layer) steel plate, leading to reduced amount and cost of the material.

Further, in the high-strength, high-toughness and wear-resistant composite steel plate according to the present disclosure, the substrate layer comprises the following chemical elements in percentage by mass of:

C: 0.10-0.25 wt. %; Si: 0.10-1.00 wt. %; Mn: 0.40-2.00 wt. %; Cr: 0.01-2.00 wt. %; Mo: 0.01-1.00 wt. %; Ni: 0.01-2.00 wt. %; Nb: 0.001-0.080 wt. %; B: 0.0005-0.0040 wt. %; Al: 0.010-0.080 wt. %; and the balance of Fe and other unavoidable impurities.

The principle for designing the various chemical elements of the substrate layer in the high-strength, high-toughness and wear-resistant composite steel plate according to the present disclosure is described as follows:

C: Carbon is the most basic and important element in wear-resistant steel. The strength and hardness of the steel are improved by solid solution strengthening and precipitation strengthening. However, an excessive amount of carbon will reduce the toughness and plasticity. Therefore, the mass percentage of C in the substrate layer of the high-strength, high-toughness and wear-resistant composite steel plate according to the present disclosure is controlled in the range of 0.10-0.25%.

Si: An appropriate mass percentage of silicon is a beneficial deoxidizer in steel. It can combine with calcium and aluminum in the steel to form calcium/aluminum silicate inclusions that can float up easily to increase the purity of the steel. Silicon is solid-dissolved in ferrite and austenite to increase their hardness and strength. However, when the mass percentage of silicon is too high, it will lead to a sharp decline in the toughness of the steel. Therefore, the mass percentage of Si in the substrate layer of the high-strength, high-toughness and wear-resistant composite steel plate according to the present disclosure is controlled in the range of 0.10-1.00%.

Mn: In the technical solution according to the present disclosure, addition of Mn is beneficial to improve steel hardenability. Therefore, the mass percentage of Mn is controlled in the range of 0.40-2.00%.

Cr: Chromium can improve steel hardenability and increase the strength and hardness of the steel. In addition, chromium can prevent or slow down precipitation and aggregation of carbides during tempering, which can improve tempering resistance of the steel. Therefore, the mass percentage of Cr in the substrate layer of the high-strength, high-toughness and wear-resistant composite steel plate according to the present disclosure is controlled in the range of 0.01-2.00%.

Mo: Molybdenum can refine grains and improve strength and toughness. At the same time, molybdenum is an element that reduces temper brittleness and can improve tempering resistance. Therefore, the mass percentage of Mo in the substrate layer of the high-strength, high-toughness and wear-resistant composite steel plate according to the present disclosure is controlled in the range of 0.01-1.00%.

Ni: Nickel has the effect of significantly lowering the ductile-brittle transition temperature. However, an unduly high mass percentage of nickel is likely to increase difficulty in scale exfoliation from the surface of the steel plate. Moreover, addition of excessive nickel increases the production cost significantly. Therefore, the mass percentage of Ni in the substrate layer of the high-strength, high-toughness and wear-resistant composite steel plate according to the present disclosure is controlled in the range of 0.01-2.00%.

Nb: Niobium improves steel strength and toughness by way of grain refinement. Therefore, the mass percentage of Nb in the substrate layer in the technical solution according to the present disclosure is controlled in the range of 0.001-0.080%.

B: Boron increases steel hardenability. However, an unduly high mass percentage of boron may cause hot embrittlement which affects the welding performance and hot workability of the steel. Therefore, the mass percentage of B in the substrate layer of the high-strength, high-toughness and wear-resistant composite steel plate according to the present disclosure is controlled in the range of 0.0005-0.0040%.

Al: Aluminum and nitrogen in steel can form insoluble fine AlN particles and refine steel grains. In addition, aluminum can refine steel grains, immobilize nitrogen and oxygen in the steel, reduce the notch sensitivity of the steel, alleviate or eliminate the aging phenomenon of the steel, and improve the toughness of the steel. Therefore, the mass percentage of Al in the substrate layer of the high-strength, high-toughness and wear-resistant composite steel plate according to the present disclosure is controlled in the range of 0.010-0.080%.

It should be noted that impurities in the high-strength, high-toughness and wear-resistant composite steel plate according to the present disclosure are disadvantageous for improvement of the properties of the steel plate, and also reduce the quality and service life of the steel plate. However, excessively strict control of the impurities will increase the production cost notably. In view of the above considerations, the unavoidable impurities such as P, S, N, H, and O in the substrate layer of the high-strength, high-toughness and wear-resistant composite steel plate according to the present disclosure are controlled as follows: P<0.030%; S<0.010%; N≤0.0080%; O≤0.0080%; H≤0.0004%.

Further, the substrate layer in the high-strength, high-toughness and wear-resistant composite steel plate according to the present disclosure further comprises at least one of the following chemical elements: 0<V≤0.080 wt. % and 0<Ti≤0.060 wt. %.

Further, the chemical elements of the substrate layer in the high-strength, high-toughness and wear-resistant composite steel plate according to the present disclosure further meet at least one of 0.20%≤(Cr/5+Mn/6+50B)≤0.55%, 0.10%≤(Mo/3+Ni/5+2Nb)≤0.42% and 0.02%≤(Al+Ti)≤0.12%.

In the above formulas, each element represents the mass percentage of the corresponding element.

Further, the substrate layer in the wear-resistant composite steel plate according to the present disclosure comprises a microstructure of martensite+residual austenite.

Further, the substrate layer in the high-strength, high-toughness and wear-resistant composite steel plate according to the present disclosure has a tensile strength of ≥1200 MPa, a yield strength of ≥1000 MPa, an elongation of ≥14%, a Brinell hardness of ≥400 HB, and a Charpy V-notch longitudinal impact energy at −40° C. of ≥60 J.

Further, the compounding layer in the high-strength, high-toughness and wear-resistant composite steel plate according to the present disclosure comprises the following chemical elements in percentage by mass of:

C: 1.30-1.80 wt. %; Si: 0.20-1.50 wt. %; Mn: 16.00-25.00 wt. %; Cr: 0.01-3.00 wt. %; Mo: 0.01-1.00 wt. %; Ti: ≤0.060%; Al: 0.010-0.080 wt. %; and the balance of Fe and other unavoidable impurities.

The principle for designing the various chemical elements of the compounding layer in the high-strength, high-toughness and wear-resistant composite steel plate according to the present disclosure is described as follows:

C: Carbon is the most basic and important element in wear-resistant steel. The strength and hardness of the steel are improved by solid solution strengthening and precipitation strengthening. The mass percentage of carbon in the compounding layer of the high-strength, high-toughness and wear-resistant composite steel plate according to the present disclosure is controlled in the range of 1.30-1.80%.

Si: An appropriate amount of silicon is a beneficial deoxidizer in steel. It can combine with calcium and aluminum in the steel to form calcium/aluminum silicate inclusions that can float up easily to increase the purity of the steel. Silicon is solid-dissolved in ferrite and austenite to increase their hardness and strength. However, when the mass percentage of silicon is too high, it will lead to a sharp decline in the toughness of the steel. Therefore, the mass percentage of Si in the compounding layer of the high-strength, high-toughness and wear-resistant composite steel plate according to the present disclosure is controlled in the range of 0.20-1.50%.

Mn: Manganese improves steel hardenability. It's a key element for formation of austenite structure. The mass percentage of Mn in the compounding layer of the high-strength, high-toughness and wear-resistant composite steel plate according to the present disclosure is controlled in the range of 16.00-25.00%.

Cr: Chromium can improve steel hardenability and increase the strength and hardness of the steel. Chromium can prevent or slow down precipitation and aggregation of carbides during tempering, which can improve the tempering resistance of the steel. Therefore, the mass percentage of Cr in the compounding layer of the high-strength, high-toughness and wear-resistant composite steel plate according to the present disclosure is controlled in the range of 0.01-3.00%.

Mo: Molybdenum can refine grains and improve steel strength and toughness. At the same time, molybdenum is an element that reduces temper brittleness and can improve tempering resistance. Therefore, the mass percentage of Mo in the compounding layer of the high-strength, high-toughness and wear-resistant composite steel plate according to the present disclosure is controlled in the range of 0.01-1.00%.

Ti: Titanium is one of the strong carbide forming elements, and combines with carbon to form fine TiC particles. TiC particles are small, and are distributed at grain boundaries, so as to achieve the effect of refining grains. Relatively rigid TiC particles improve the wear resistance of the steel. Therefore, the mass percentage of Ti in the compounding layer of the high-strength, high-toughness and wear-resistant composite steel plate according to the present disclosure is controlled in the range of Ti≤0.060%.

Al: Aluminum and nitrogen in steel can form insoluble fine AlN particles and refine steel grains. Aluminum can refine steel grains, immobilize nitrogen and oxygen in the steel, reduce the notch sensitivity of the steel, alleviate or eliminate the aging phenomenon of the steel, and improve the toughness of the steel. Therefore, the mass percentage of Al in the compounding layer in the technical solution according to the present disclosure is controlled in the range of 0.010-0.08%.

In addition, it should be noted that unavoidable impurities such as P and S in the compounding layer of the high-strength, high-toughness and wear-resistant composite steel plate according to the present disclosure are controlled as follows: P<0.030%; S<0.010%.

Further, the compounding layer in the high-strength, high-toughness and wear-resistant composite steel plate according to the present disclosure comprises a microstructure of austenite.

Further, the compounding layer in the high-strength, high-toughness and wear-resistant composite steel plate according to the present disclosure has a tensile strength of ≥500 MPa, an elongation of ≥12%, a Brinell hardness of ≥170 HB, and a Charpy U-notch longitudinal impact energy at −40° C. of ≥40 J.

Accordingly, another object of the present disclosure is to provide a method for manufacturing the above high-strength, high-toughness and wear-resistant composite steel plate. The high-strength, high-toughness and wear-resistant composite steel plate obtained using this manufacturing method has high strength, high hardness, high wear resistance and high toughness. The comprehensive properties of the steel plate are excellent.

In order to achieve the above object, there is provided herein a method for manufacturing the above high-strength, high-toughness and wear-resistant composite steel plate, comprising steps of:
(1) Preparing a substrate layer slab and a compounding layer slab;
(2) Assembling the slabs;
(3) Heating: heating temperature: 1150-1250° C., holding time: 1-3 hours;
(4) Compounding rolling: rolling-start temperature: 1120-1220° C., rolling-end temperature: 1050-1200° C., reduction rate being controlled at ≥50%; and
(5) Post-rolling cooling.

In step (1) of the manufacturing method of the present disclosure, the substrate layer slab and the compounding layer slab may be prepared by either continuous casting or die casting. In some preferred embodiments, during continuous casting, the continuous casting speed is controlled to ensure that the continuous casting speed is ≤1.0 m/min to achieve the effect that the internal composition of the cast slabs is homogeneous, and the surface quality is superior. In some other embodiments, in the case of die casting, a die-cast steel ingot needs to be rolled into a primarily rolled slab, followed by cooling at a slow rate to avoid cracking caused by martensite transformation.

In addition, before assembling the slabs, the substrate layer slab and compounding layer slab may be pre-treated. For example, a mechanical process may be used to clean the scale on a single surface of each slab, and then the four edges of the single surface that has been cleaned may be beveled. The slabs with cleaned surfaces are positioned with the cleaned surfaces facing each other.

In step (2) of the manufacturing method according to the present disclosure, after the slabs are pressed together, they are joined and sealed by welding, while vacuum passages are left at the sides. After sealed by welding, the assembled composite slabs are evacuated.

The heating temperature used in step (3) is controlled between 1150° C. and 1250° C. for the reason that this heating temperature allows the second phase particles such as V(C, N) to be dissolved, and Ti(C, N) to be dissolved partially, so as to obtain a uniform austenite structure while ensuring that austenite grains will not grow large.

Additionally, in addition to controlling the heating temperature and holding time for the slabs in step (3) to ensure successful rolling of the slabs, the temperatures and reduction rate in the rolling process in step (4) are important parameters for guaranteeing the shape and properties of the steel plate, wherein the rolling-start temperature is controlled in the range of 1120-1220° C., and the rolling-end temperature is controlled in the range of 1050-1200° C. After rolling, the steel plate is directly cooled by water or air to obtain a uniform structure.

Further, in step (5) of the method for manufacturing the high-strength, high-toughness and wear-resistant composite steel plate according to the present disclosure, water cooling is used to cool the composite steel plate to room temperature–300° C. at a cooling rate of ≥10° C./s.

Further, in step (5) of the method for manufacturing the high-strength, high-toughness and wear-resistant composite steel plate according to the present disclosure, air cooling is used to cool the composite steel plate to room temperature, followed by step (6): offline quenching.

Further, in step (6) of the method for manufacturing the high-strength, high-toughness and wear-resistant composite steel plate according to the present disclosure, quenching temperature is 1050-1100° C., and holding time is (1.5×t) min, where t represents plate thickness in mm.

Compared with the prior art, the high-strength, high-toughness and wear-resistant composite steel plate according to the present disclosure has the following characteristics:
1. In terms of the chemical composition, the composition of the substrate layer in the high-strength, high-toughness and wear-resistant composite steel plate according to the present disclosure comprises mainly a medium to low content of carbon and medium to low contents of alloying elements. The refining and strengthening effects of microalloying elements such as Mn, Cr, Mo, Nb, Ti are fully exploited to ensure that the composite steel plate has superior comprehensive properties.

2. In terms of the production process, by compounding assembly of the substrate layer (i.e. the carbon steel layer) and the compounding layer (i.e. the ultra-high manganese steel layer), and by controlling the process parameters, particularly the rolling-start temperature, rolling-end temperature, reduction rate and cooling rate, the technical solution according to the present disclosure achieves improvement in structure refinement and strengthening effect, and further reduces the contents of carbon and alloying elements, thereby obtaining a steel plate having both excellent mechanical properties and excellent welding behavior. In addition, the manufacturing method of the present disclosure has the characteristics of short production process, high efficiency, energy saving, and low cost.

3. In terms of the product properties, in the high-strength, high-toughness and wear-resistant composite steel plate according to the present disclosure, the substrate layer has high strength, high hardness, and high toughness, wherein the mechanical properties of the substrate layer include: tensile strength ≥1200 MPa, yield strength ≥1000 MPa, elongation ≥14%, Brinell hardness ≥400 HB, and Charpy V-notch longitudinal impact energy at −40° C. ≥60 J; and the mechanical properties of the compounding layer include: hardness ≥170 HB, tensile strength ≥500 MPa, elongation ≥12%, and Charpy U-notch longitudinal impact energy at −40° C. ≥40 J.

4. In terms of the microstructure, by fully exploiting the addition of the alloying elements and controlling the process conditions, martensite+residual austenite is obtained in the substrate layer in the high-strength, high-toughness and wear-resistant composite steel plate according to the present disclosure, and an austenite structure is obtained in the compounding layer. Due to the large difference in composition between the substrate layer and the compounding layer, new compounds of C, Mn, Cr and Mo are produced at the compounding interface during slab heating, rolling and heat treatment, which is beneficial to improve the strength, hardness and wear resistance of the steel plate, and helps to improve the bonding strength of the substrate layer and the compounding layer.

5. With an appropriate composition system and an appropriate process including heating, rolling and heat treatment, the advantages are fully taken of the substrate layer (i.e. the carbon steel layer) and the compounding layer (i.e. the ultra-high manganese steel layer) in the high-strength, high-toughness and wear-resistant composite steel plate of the present disclosure: owing to the ultra-high strength and toughness of the carbon steel layer, deformation of the whole steel plate is prevented when the ultra-high manganese steel layer is subjected to impact and work hardening; and the ultra-high wear resistance of the ultra-high manganese steel layer can be fully utilized, which is very beneficial to practical applications.

In short, the high-strength, high-toughness and wear-resistant composite steel plate of the present disclosure possesses obvious advantages. The steel plate obtained by controlling the contents of carbon and alloy elements and each heat treatment process has low cost, simple process, high hardness, good low temperature toughness, and high wear resistance. It's suitable for easy-to-wear parts in various kinds of mechanical equipment.

DETAILED DESCRIPTION

The high-strength, high-toughness and wear-resistant composite steel plate and the method for manufacturing the same according to the disclosure will be further explained and illustrated with reference to the specific examples. Nonetheless, the explanation and illustration are not intended to unduly limit the technical solution of the disclosure.

Examples 1-10

Table 1-1 and Table 1-2 list the mass percentage of each chemical element in the substrate layers in the high-strength, high-toughness and wear-resistant composite steel plates of Examples 1-10.

TABLE 1-1

(wt %, the balance is Fe and other unavoidable impurities except for S, P, N, H and O)

|  | C | Si | Mn | P | S | Cr | Mo | Ni | Micro structure |
|---|---|---|---|---|---|---|---|---|---|
| Ex. 1 | 0.1 | 0.76 | 1.75 | 0.013 | 0.008 | 0.25 | 0.36 | 0.49 | Martensite + residual austenite |
| Ex. 2 | 0.13 | 0.55 | 1.62 | 0.011 | 0.006 | 0.49 | 0.21 | 0.01 | Martensite + residual austenite |
| Ex. 3 | 0.15 | 0.27 | 1.45 | 0.01 | 0.003 | 0.33 | 0.26 | 0.01 | Martensite + residual austenite |
| Ex. 4 | 0.17 | 0.45 | 1.52 | 0.012 | 0.004 | 0.26 | 0.33 | 0.01 | Martensite + residual austenite |
| Ex. 5 | 0.19 | 0.33 | 1.26 | 0.008 | 0.005 | 1 | 0.45 | 0.01 | Martensite + residual austenite |
| Ex. 6 | 0.2 | 0.19 | 1.38 | 0.01 | 0.003 | 0.01 | 0.29 | 0.01 | Martensite + residual austenite |
| Ex. 7 | 0.21 | 0.42 | 1.13 | 0.011 | 0.002 | 0.55 | 0.53 | 0.01 | Martensite + residual austenite |
| Ex. 8 | 0.23 | 0.26 | 1.28 | 0.009 | 0.005 | 0.46 | 0.01 | 0.88 | Martensite + residual austenite |
| Ex. 9 | 0.24 | 0.13 | 1.05 | 0.01 | 0.004 | 0.66 | 0.32 | 0.01 | Martensite + residual austenite |
| Ex. 10 | 0.25 | 0.35 | 0.82 | 0.008 | 0.003 | 0.38 | 0.29 | 1.21 | Martensite + residual austenite |

TABLE 1-2

(wt %, the balance is Fe and other unavoidable impurities except for S, P, N, H and O)

|  | Nb | V | Ti | Al | B | N | O | H | Cr/5 + Mn/6 + 50B | Mo/3 + Ni/5 + 2Nb | Al + Ti |
|---|---|---|---|---|---|---|---|---|---|---|---|
| Ex. 1 | 0.065 | 0.075 | 0.015 | 0.056 | 0.003 | 0.0053 | 0.0042 | 0.0003 | 0.49 | 0.35 | 0.07 |
| Ex. 2 | 0.025 | 0.001 | 0.021 | 0.044 | 0.0015 | 0.0042 | 0.0035 | 0.0003 | 0.44 | 0.12 | 0.07 |
| Ex. 3 | 0.016 | 0.001 | 0.008 | 0.020 | 0.0011 | 0.0055 | 0.00638 | 0.0002 | 0.36 | 0.12 | 0.03 |

TABLE 1-2-continued (wt %, the balance is Fe and other unavoidable impurities except for S, P, N, H and O)

|  | Nb | V | Ti | Al | B | N | O | H | Cr/5 + Mn/6 + 50B | Mo/3 + Ni/5 + 2Nb | Al + Ti |
|---|---|---|---|---|---|---|---|---|---|---|---|
| Ex. 4 | 0.037 | 0.001 | 0.001 | 0.051 | 0.0017 | 0.0062 | 0.0038 | 0.0004 | 0.39 | 0.19 | 0.05 |
| Ex. 5 | 0.001 | 0.001 | 0.031 | 0.049 | 0.002 | 0.0031 | 0.0021 | 0.0002 | 0.51 | 0.15 | 0.08 |
| Ex. 6 | 0.028 | 0.001 | 0.020 | 0.035 | 0.0005 | 0.0051 | 0.0035 | 0.0002 | 0.26 | 0.15 | 0.06 |
| Ex. 7 | 0.001 | 0.052 | 0.015 | 0.065 | 0.0016 | 0.0038 | 0.0041 | 0.0002 | 0.38 | 0.18 | 0.08 |
| Ex. 8 | 0.001 | 0.001 | 0.049 | 0.052 | 0.0013 | 0.0041 | 0.0025 | 0.0003 | 0.37 | 0.18 | 0.10 |
| Ex. 9 | 0.033 | 0.001 | 0.010 | 0.041 | 0.0018 | 0.0050 | 0.0037 | 0.0003 | 0.40 | 0.17 | 0.05 |
| Ex. 10 | 0.019 | 0.001 | 0.016 | 0.039 | 0.002 | 0.0029 | 0.0021 | 0.0002 | 0.31 | 0.38 | 0.06 |

Table 2 lists the mass percentage of each chemical element in the compounding layers in the high-strength, high-toughness and wear-resistant composite steel plates of Examples 1-10.

TABLE 2

(wt %, the balance is Fe and other unavoidable impurities except for S and P)

|  | C | Si | Mn | P | S | Cr | Mo | Ti | Al | Microstructure |
|---|---|---|---|---|---|---|---|---|---|---|
| Ex. 1 | 1.3 | 0.33 | 22 | 0.012 | 0.002 | 1.35 | 0.01 | 0.001 | 0.033 | Austenite |
| Ex. 2 | 1.35 | 0.36 | 21.5 | 0.011 | 0.003 | 2.5 | 0.53 | 0.012 | 0.031 | Austenite |
| Ex. 3 | 1.4 | 0.45 | 16 | 0.008 | 0.006 | 1.88 | 0.21 | 0.001 | 0.015 | Austenite |
| Ex. 4 | 1.45 | 0.62 | 25 | 0.012 | 0.005 | 2.3 | 0.01 | 0.001 | 0.025 | Austenite |
| Ex. 5 | 1.5 | 0.38 | 22 | 0.011 | 0.003 | 1.2 | 0.15 | 0.011 | 0.033 | Austenite |
| Ex. 6 | 1.55 | 0.25 | 22 | 0.009 | 0.007 | 1.0 | 0.01 | 0.001 | 0.041 | Austenite |
| Ex. 7 | 1.6 | 0.41 | 24.5 | 0.009 | 0.003 | 1.30 | 0.27 | 0.015 | 0.021 | Austenite |
| Ex. 8 | 1.65 | 0.33 | 23 | 0.012 | 0.005 | 1.38 | 0.01 | 0.001 | 0.041 | Austenite |
| Ex. 9 | 1.7 | 0.22 | 21 | 0.009 | 0.003 | 2.0 | 0.21 | 0.001 | 0.011 | Austenite |
| Ex. 10 | 1.8 | 0.55 | 18 | 0.011 | 0.005 | 0.93 | 0.01 | 0.01 | 0.056 | Austenite |

The high-strength, high-toughness and wear-resistant composite steel plates of Examples 1-10 were prepared using the following steps:
(1) Smelting according to Tables 1-1, 1-2 and 2 to obtain the substrate layer slabs and compounding layer slabs;
(2) Assembling the slabs;
(3) Heating: heating temperature: 1150-1250° C., holding time: 1-3 hours;
(4) Compounding rolling: rolling-start temperature: 1120-1220° C., rolling-end temperature: 1050-1200° C., reduction rate being controlled at ≥50%; and
(5) Post-rolling cooling.

It should be noted that when water cooling was used in step (5), the plates were cooled to room temperature–300° C. at a cooling rate of ≥10° C./s; if the plates were cooled by air cooling to room temperature in step (5), it should be followed by step (6): offline quenching, wherein the quenching temperature was 1050-1100° C., and the holding time was (1.5×t) min, where t represented the thickness of the steel plate in mm.

Table 3 lists the specific process parameters in each step for the high-strength, high-toughness and wear-resistant composite steel plates of Examples 1-10.

TABLE 3

|  | Step (3) | | Step (4) | | | | Step (5) | | Step (6) | | |
|---|---|---|---|---|---|---|---|---|---|---|---|
|  | Heating temperature (° C.) | Holding time (h) | Rolling-start temperature (° C.) | Rolling-end temperature (° C.) | Reduction rate (%) | Cooling mode | Cooling rate (° C./s) | End Cooling Temperature (° C.) | Quenching Temperature (° C.) | Quenching holding time (min) | Steel plate thickness (mm) |
| Ex. 1 | 1170 | 2 | 1150 | 1100 | 82 | Air cooling | / | Room Temperature | 1080 | 22.5 | 15 |
| Ex. 2 | 1150 | 2.5 | 1130 | 1050 | 66 | Air cooling | / | Room Temperature | 1100 | 30 | 20 |
| Ex. 3 | 1230 | 2 | 1200 | 1150 | 73 | Water cooling | 28 | 255 | / | / | 20 |
| Ex. 4 | 1250 | 2 | 1200 | 1130 | 76 | Water cooling | 35 | 193 | / | / | 30 |
| Ex. 5 | 1230 | 2 | 1200 | 1120 | 69 | Water cooling | 40 | 235 | / | / | 20 |
| Ex. 6 | 1170 | 2 | 1150 | 1100 | 77 | Air cooling | / | Room Temperature | 1080 | 24 | 16 |
| Ex. 7 | 1200 | 2.5 | 1180 | 1115 | 71 | Air cooling | / | Room Temperature | 1060 | 34.5 | 23 |

TABLE 3-continued

|  | Step (3) | | Step (4) | | | | Step (5) | | Step (6) | | Steel plate thickness (mm) |
|---|---|---|---|---|---|---|---|---|---|---|---|
|  | Heating temperature (° C.) | Holding time (h) | Rolling-start temperature (° C.) | Rolling-end temperature (° C.) | Reduction rate (%) | Cooling mode | Cooling rate (° C./s) | End Cooling Temperature (° C.) | Quenching Temperature (° C.) | Quenching holding time (min) | |
| Ex. 8 | 1210 | 2.5 | 1190 | 1110 | 82 | Water cooling | 37 | 175 | / | / | 15 |
| Ex. 9 | 1230 | 3 | 1210 | 1120 | 83 | Water cooling | 29 | Room Temperature | / | / | 22 |
| Ex. 10 | 1250 | 3 | 1220 | 1135 | 60 | Water cooling | 36 | 256 | / | / | 18 |

The high-strength, high-toughness and wear-resistant composite steel plates of Examples 1-10 were sampled for tests of mechanical properties. The test results are listed in Table 4 and Table 5.

Table 4 lists the mechanical property parameters of the substrate layers in the high-strength, high-toughness and wear-resistant composite steel plates of Examples 1-10.

TABLE 4

|  | Hardness (HBW) | Lateral tensile properties | | | Charpy V-notch longitudinal impact energy at −40° C. (J) |
|---|---|---|---|---|---|
|  |  | Yield strength (MPa) | Tensile strength (MPa) | Elongation (%) | |
| Ex. 1 | 412 | 1005 | 1265 | 15 | 82 |
| Ex. 2 | 416 | 1065 | 1295 | 15 | 78 |
| Ex. 3 | 415 | 1065 | 1280 | 15 | 73 |
| Ex. 4 | 416 | 1070 | 1300 | 15 | 71 |
| Ex. 5 | 417 | 1075 | 1280 | 15 | 72 |
| Ex. 6 | 425 | 1075 | 1320 | 15 | 78 |
| Ex. 7 | 427 | 1095 | 1325 | 15 | 79 |
| Ex. 8 | 430 | 1105 | 1350 | 14 | 71 |
| Ex. 9 | 452 | 1120 | 1450 | 14 | 72 |
| Ex. 10 | 431 | 1100 | 1355 | 14 | 76 |

Table 5 lists the mechanical property parameters of the compounding layers in the high-strength, high-toughness and wear-resistant composite steel plates of Examples 1-10.

TABLE 5

|  | Hardness (HBW) | Lateral tensile properties | | | Charpy U-notch longitudinal impact energy at −40° C. (J) |
|---|---|---|---|---|---|
|  |  | Yield strength (MPa) | Tensile strength (MPa) | Elongation (%) | |
| Ex. 1 | 255 | 575 | 800 | 13 | 85 |
| Ex. 2 | 265 | 560 | 810 | 13 | 80 |
| Ex. 3 | 285 | 585 | 825 | 13 | 76 |
| Ex. 4 | 280 | 580 | 835 | 13 | 75 |
| Ex. 5 | 300 | 600 | 835 | 12 | 72 |
| Ex. 6 | 310 | 625 | 845 | 12 | 66 |
| Ex. 7 | 305 | 600 | 845 | 12 | 65 |
| Ex. 8 | 315 | 610 | 870 | 12 | 58 |
| Ex. 9 | 310 | 615 | 860 | 12 | 60 |
| Ex. 10 | 320 | 605 | 875 | 12 | 66 |

As shown by Tables 4 and 5, in the high-strength, high-toughness and wear-resistant composite steel plates of the various Examples according to the present disclosure, the substrate layer has high strength, high hardness, and high toughness, wherein the mechanical properties of the substrate layer include: tensile strength ≥1200 MPa, yield strength ≥1000 MPa, elongation ≥14%, Brinell hardness ≥400 HB, and Charpy V-notch longitudinal impact energy at −40° C. ≥60 J; and the mechanical properties of the compounding layer include: hardness ≥170 HB, tensile strength ≥500 MPa, elongation ≥12%, and Charpy U-notch longitudinal impact energy at −40° C.≥40 J.

It's to be noted that the prior art portions in the protection scope of the present disclosure are not limited to the examples set forth in the present application file. All the prior art contents not contradictory to the technical solution of the present disclosure, including but not limited to prior patent literature, prior publications, prior public uses and the like, may all be incorporated into the protection scope of the present disclosure.

In addition, the ways in which the various technical features of the present disclosure are combined are not limited to the ways recited in the claims of the present disclosure or the ways described in the specific examples. All the technical features recited in the present disclosure may be combined or integrated freely in any manner, unless contradictions are resulted.

It should also be noted that the Examples set forth above are only specific examples according to the present disclosure. Obviously, the present disclosure is not limited to the above Examples. Similar variations or modifications made thereto can be directly derived or easily contemplated from the present disclosure by those skilled in the art. They all fall in the protection scope of the present disclosure.

What is claimed is:

1. A composite steel plate, comprising a substrate layer and a compounding layer compounded on both surfaces of the substrate layer, or consisting of a substrate layer and a compounding layer compounded on one surface of the substrate layer, wherein the substrate layer is a carbon steel layer, and the compounding layer is an ultra-high manganese steel layer, wherein the compounding layer has a Mn element content of 16.00-25.00 wt %, wherein the substrate layer comprises a microstructure of martensite and residual austenite and comprises the following chemical elements in mass percentage: C: 0.10-0.25 wt. %; Si: 0.10-1.00 wt. %; Mn: 0.40-2.00 wt. %; Cr: 0.01-2.00 wt. %; Mo: 0.01-1.00 wt. %; Ni: 0.01-2.00 wt. %; Nb: 0.001-0.080 wt. %; B: 0.0005-0.0040 wt. %; Al: 0.010-0.080 wt. %; and the balance of Fe and other unavoidable impurities, and has a tensile strength of ≥1200 MPa, a yield strength of ≥1000 MPa, an elongation of ≥14%, a Brinell hardness of ≥400 HB, and a Charpy V-notch longitudinal impact energy at −40° C. of ≥60 J, and the compounding layer comprises a microstructure of austenite and consists of the following chemical elements in mass percentage: C: 1.30-1.80 wt. %; Si: 0.20-1.50 wt. %; Mn: 16.00-25.00 wt. %; Cr: 0.01-3.00 wt. %; Mo: 0.01-1.00 wt. %; Ti: ≤0.060%; Al: 0.010-0.080 wt. %; and the balance of Fe and other unavoidable impurities, and has a tensile strength of ≥500 MPa, an elongation of ≥12%, a Brinell hardness of ≥170 HB, and a Charpy U-notch longitudinal impact energy at −40° C. of ≥40 J, and wherein the composite steel plate is obtained by a rolling compounding process with a rolling-start temperature of 1120-1220° C. and a rolling-end temperature of 1050-1200° C.

2. The composite steel plate of claim 1, wherein the substrate layer further comprises at least one of the following chemical elements: 0<V≤0.080 wt. % and 0<Ti≤0.060 wt. %.

3. The composite steel plate of claim 1, wherein the chemical elements of the substrate layer further meet at least one of 0.20%≤(Cr/5+Mn/6+50B)≤0.55%, 0.10%≤(Mo/3+Ni/5+2Nb)≤0.42% and 0.02%≤(Al+Ti)≤0.12%.

4. A method for manufacturing the composite steel plate of claim 1, wherein the method comprises the following steps:

(1) Preparing a substrate layer slab and a compounding layer slab;

(2) Assembling the slabs;

(3) Heating: heating temperature: 1150-1250° C., holding time: 1-3 hours;

(4) Compounding rolling: rolling-start temperature: 1120-1220° C., rolling-end temperature: 1050-1200° C., reduction rate being controlled at ≥50%; and (5) Post-rolling cooling.

5. The method for manufacturing the composite steel plate according to claim 4, wherein water cooling is used in step (5) to cool the composite steel plate to room temperature–300° C. at a cooling rate of ≥10° C./s.

6. The method for manufacturing the composite steel plate according to claim 4, wherein air cooling is used in step (5) to cool the composite steel plate to room temperature, followed by step (6): offline quenching.

7. The method for manufacturing the composite steel plate according to claim 6, wherein, in step (6), quenching temperature is 1050-1100° C., and holding time is (1.5×t) min, where t represents plate thickness in mm.

* * * * *